April 23, 1935.  E. MEYER  1,998,817
METHOD OF MAKING BELTS
Original Filed Nov. 18, 1930
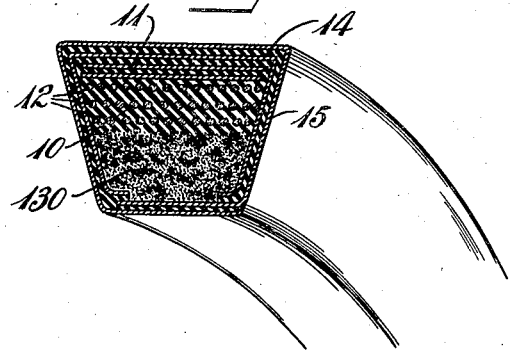
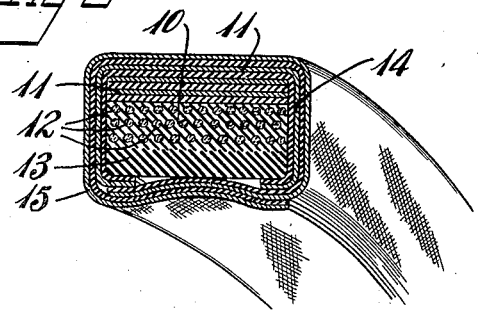
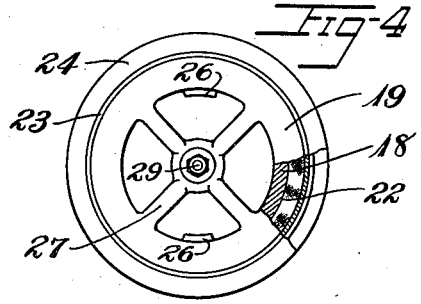
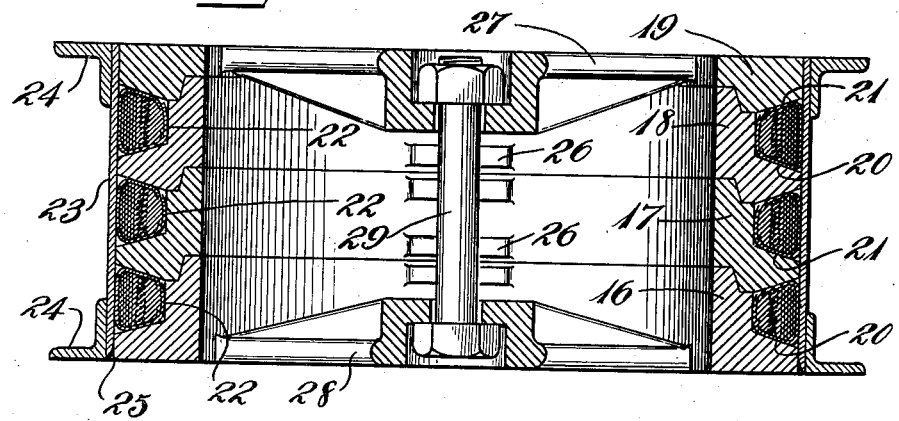
Inventor
Ernest Meyer
By Eakin & Avery
Attys Patented Apr. 23, 1935

1,998,817

UNITED STATES PATENT OFFICE 1,998,817

METHOD OF MAKING BELTS

Ernest Meyer, Akron, Ohio, assignor to The B. F. Goodrich Company, New York, N. Y., a corporation of New York Original application November 18, 1930, Serial No. 496,395. Divided and this application April 1, 1933, Serial No. 663,906

1 Claim. (Cl. 18—59)

This invention relates to belts, more especially endless side driving belts for power transmission purposes, and to apparatus and methods for making the same. This is a division of application Serial No. 496,395, filed November 18, 1930.

Objects of the invention are to provide for the making of endless belts of rubberized fibrous material wherein the necessity for applying molding pressure externally of the belts to mold the same is avoided, to dispense with the use of fabric wrappings in molding belts; to provide improved procedure for producing belts of uniformly high quality and attractive appearance, and to provide improved molding apparatus for producing belts.

A further object is to provide an improved belt which, in addition to possessing high tensile strength and low stretchability, possesses also a high degree of flexibility, ability to run with a high degree of smoothness and efficiency, and a long, useful life.

Other more detailed objects will appear from the following specification, of which the accompanying drawing forms a part.

In the drawing:

Fig. 1 is a fragmentary perspective view in section of a molded belt made according to the invention.

Fig. 2 is a fragmentary perspective view in section of the belt shown in Fig. 1, but before the same has been molded.

Fig. 3 is a view in sectional elevation of a mold having a plurality of belts positioned therein ready for cure.

Fig. 4 is a plan view, reduced in size, of the mold of Fig. 3.

Referring to Fig. 2, which shows a belt with its components assembled and ready for molding and vulcanization, 10 indicates a core or body portion preferably comprising in its outer periphery several plies 11 of square-woven and bias-cut rubberized fabric, at its central portion a group of rubberized reinforcing cords 12, preferably in the form of one or more plies of weak-wefted or weftless cord fabric, and at its inner periphery a layer 13 of rubber composition containing a blowing agent for purposes to be explained hereinafter. The belt is provided with inner and outer wrappers, 14 and 15 respectively, of square-woven and bias-cut rubberized fabric, the plies thereof overlapping in double thickness over the walls of the belt and the edges of the wrappers terminating preferably at the inner periphery of the belt, as shown.

The layers of the core 10 are assembled preferably by means of a mandrel or drum on the surface of which the stock in the form of sheets is plied up. A sheet of the rubber composition of which the layer 13 is composed is placed next to the outer surface of the drum over its entire circumference and on top of this, in succession, are placed sheeted layers of rubberized cords 12, and the square-woven and bias-cut rubberized fabric 11, all of which layers are preferably pressed into intimate contact with each other. The assembled layers are then cut circumferentially of the drum into a plurality of rings of rectangular cross section which are removed from the drum, each ring constituting a core for an endless belt. After wrapping the core 10 in the plies 14 and 15 of the cover fabric, the belt is in readiness for molding and vulcanizing.

In Figs. 3 and 4 are illustrated a mold comprising a plurality of axially interfitting annular sections 16, 17, 18 and 19 defining at their outer surface a plurality of mold cavities and having inwardly tapering sides 20 and 21 and a bottom 22. The fourth wall of each cavity is provided for by a pressure resisting surface, such as the inner surface of an enclosing shell 23 which may be sectional with suitable securing devices but is preferably of integral, closed annular construction adapted to be mounted on the mold by relative axial movement thereon. The shell may be provided with suitable strengthening means such as the flanges 24, and may be tapered slightly at its inner surface for a short distance from one end, as indicated at 25, to facilitate movement of the shell over the outer surface of the mold during assembly. The mold sections may be provided with projecting lugs 26 serving to facilitate proper alignment of the sections during assembly and to facilitate separation of the sections subsequent to vulcanization. Spiders 27 and 28, formed integral with the end sections, afford attaching means for a bolt 29 or other detachable clamping device to hold the sections tightly together in interfitting relation.

Each ring of belt material is preferably of a diameter somewhat less than that of the cavity in which it is to be molded, so as to require the belt to be stretched to fit its mold cavity. On being placed in the cavity in this condition of stretch, the belt, due to the resiliency of its materials, tends to shrink in diameter, but is restrained from such shrinking by contact with the walls of the cavity. This stretching is desirable for several reasons, such as to eliminate wrinkles and slacking of portions of the cover and other elements of the belt, to enable the belt to accommodate itself better in the mold cavity without bulging or uneven alignment therein, and to produce a condition of low stretchability in the finished belt in use. After a belt has been placed in each mold cavity, the shell 23 is mounted in position as illustrated in Fig. 3, and the whole placed in a heated vulcanizing chamber.

Under the heat of the vulcanizing chamber, the blowing agent, heretofore mentioned, which is contained in the layer 13 and is preferably interspersed throughout the material of this layer, is caused to volatilize and expand, setting up molding pressure internally of the belt which causes the latter to fill the mold cavity and to be molded to the shape thereof. The pressure is exerted uniformly in all directions, causing the belt to accommodate itself to the shape of the mold cavity with symmetrical arrangement of the reinforcing cords as well as the other elements of the belt, and with the result that in the finished belt, each element will be properly positioned to effect its load carrying function in an efficient manner. The expasion of the blowing agent causes the layer 13 at the inner portion of the belt to be made somewhat porous, which condition obtains in the finished belt, the expanded gases after being cooled leaving small voids in the rubber composition which enable the belt in the region of the voids to yield more readily and to reduce somewhat in volume under compression, with consequently less tendency of the belt to bulge than if there were no such voids. The molding pressure exerted toward the outer periphery of the belt tends to stretch the fibrous portions of the belt located outwardly of the zone 13, and thus to eliminate slack in the reinforcing elements and to place them in better condition to resist stretching of the belt in use.

The mold is permitted to remain in the vulcanizing chamber until the belts are vulcanized, when the mold is taken from the chamber, its sections disassembled and the finished belts removed therefrom By this method of making belts, the necessity for applying molding pressure externally of the belts is eliminated, and many difficulties heretofore standing in the way of satisfactorily applying external pressure without injury to the faces of the belts or misplacement of their internal elements by inaccurate application of the pressure means, are avoided. The heretofore commonly used expedient of confining belts in mold cavities by fabric wrappings and relying on shrinkage of the fabric for pressure with the disadvantages of high cost due to rapid deterioration of the fabric, frequent formation of structural irregularities in the belts due to uneven application of pressure by the fabric, and extra labor and time required for wrapping and unwrapping the fabric, may be dispensed with.

In the new method, the belts when placed in the mold cavities may be of a volume and length sufficiently less than that of the cavities to be accommodated entirely within the cavities without bulging of portions of the belts beyond the outer surface of the mold, and further assurance against outward bulging is obtained if the belts are stretched on being placed in the cavities, as hereinbefore explained, permitting assembly of the shell 23 on the mold without likelihood of objectionable sliding contact of the shell with the outer cover surfaces of the belts. Moreover, because the belts are expanded by internal pressure from their smaller volume to the larger volume of the mold cavities, the surface portions of the belt are drawn somewhat and press against the mold surface in a smooth condition, resulting substantially in the absence of wrinkles and other malformations in the surface of the belt, and the internal pressure in cooperation with the restraining influence of the fabric cover contributes to the elimination of mold fins and pinched fabric in portions of the belt adjacent such crevices as may exist at the edges of adjoining mold parts In Fig. 1 is illustrated a finished belt with the components thereof of Fig. 2 rearranged somewhat by the molding operation to conform to the trapezoidal shape of the mold cavity. The belt as taken from the mold possesses smooth flat faces substantially free from objectionable mold fins, seams, or other irregularities which might mar its neat appearance, or which might require additional operations for removal or other treatment.

The belt possesses lateral and longitudinal resilient compressibility in the region of the porous rubber 130, which compressibility diminishes outwardly toward the outer circumference of the belt in accordance with the outwardly diminishing condition of porosity of the rubber and outwardly increasing proportion of fibrous material to rubber.

The lateral compressibilty of the belt permits accommodation of the belt to a depth in the groove of a pulley most suitable to the smooth running and efficient power transmission of the belt, the depth to which the belt will seat in the groove being determined primarily by the lateral stiffness of the belt afforded by such fibrous elements as the cords 12 and filler fabric 11, it being remembered that the relative proportion of fibrous material to rubber increases from the inner toward the outer circumference of the belt and that the belt is comparatively stiff laterally near the outer circumference thereof. Due to the porosity of the rubber the belt is capable of being reduced somewhat in volume under lateral compression, thereby reducing the tendency of portions of the belt to bulge under the wedging action of the pulley flanges, and thus making for smoother running of the belt. Moreover, the lateral compressibility of the belt permits greater tolerance in relative pulley and belt dimensions while preserving efficient gripping of the belt faces with contacting flanges of the pulley.

The longitudinal resilient compressibility of the belt portions near the inner periphery afforded by the porosity and resilience of the rubber composition permits required compression of the belt portions lying radially inward of the neutral axis when the belt is flexed, as in passing over a pulley, and this compressibility is greatest near the inner periphery of the belt where the compression due to flexure is necessarily greatest. Furthermore, this porosity of the belt portions inwardly of the neutral axis permits reduction in volume of these belt portions as a whole under the longitudinal compression of flexure, with a consequent reduction in the tendency of the belt to spread laterally at these portions during such flexure and thus making for more uniform distribution of gripping pressure by the side walls of the belt with the pulley flanges, and smoother and more efficient running of the belt. Moreover, the porosity of the rubber composition makes for low internal friction under continuous flexing, and such pores as are open to the atmosphere assist, by a breathing action during flexing, in the dissipation of heat caused by friction under continuous and rapid running over pulleys.

Due to the resiliently yielding nature of the porous rubber in the zone 130 of the belt, together with the wedging action of the rubber between the pulley flanges and the stress distributing qualities of the cover and other fabric elements of the belt, the stretch resisting cords are prevented from cutting into the rubber or moving with relation thereto to an objectionable degree when, under the stresses incident to the transmission of power between the belt and the pulley, the cords tend to move deeper in the pulley groove against the resistance of the rubber and fabric.

The invention, in some of its phases, has application to the manufacture of machine belts generally, and is not wholly limited to the production of power transmission belts of the type herein illustrated, hence it will be understood that various alterations in the materials, arrangement thereof, apparatus and procedure may be made without departing from the spirit of the invention as it is hereinafter claimed.

I claim:

The method of making an endless belt which comprises forming a ring of belt-forming material with a blowing agent in a longitudinal zone of the ring and a stretch-resisting element in the body of the ring between the zone of the blowing agent and the outer periphery of the ring, confining the ring in a mold cavity and by means of the blowing agent causing the ring to expand and fill the cavity.

ERNEST MEYER.